UNITED STATES PATENT OFFICE.

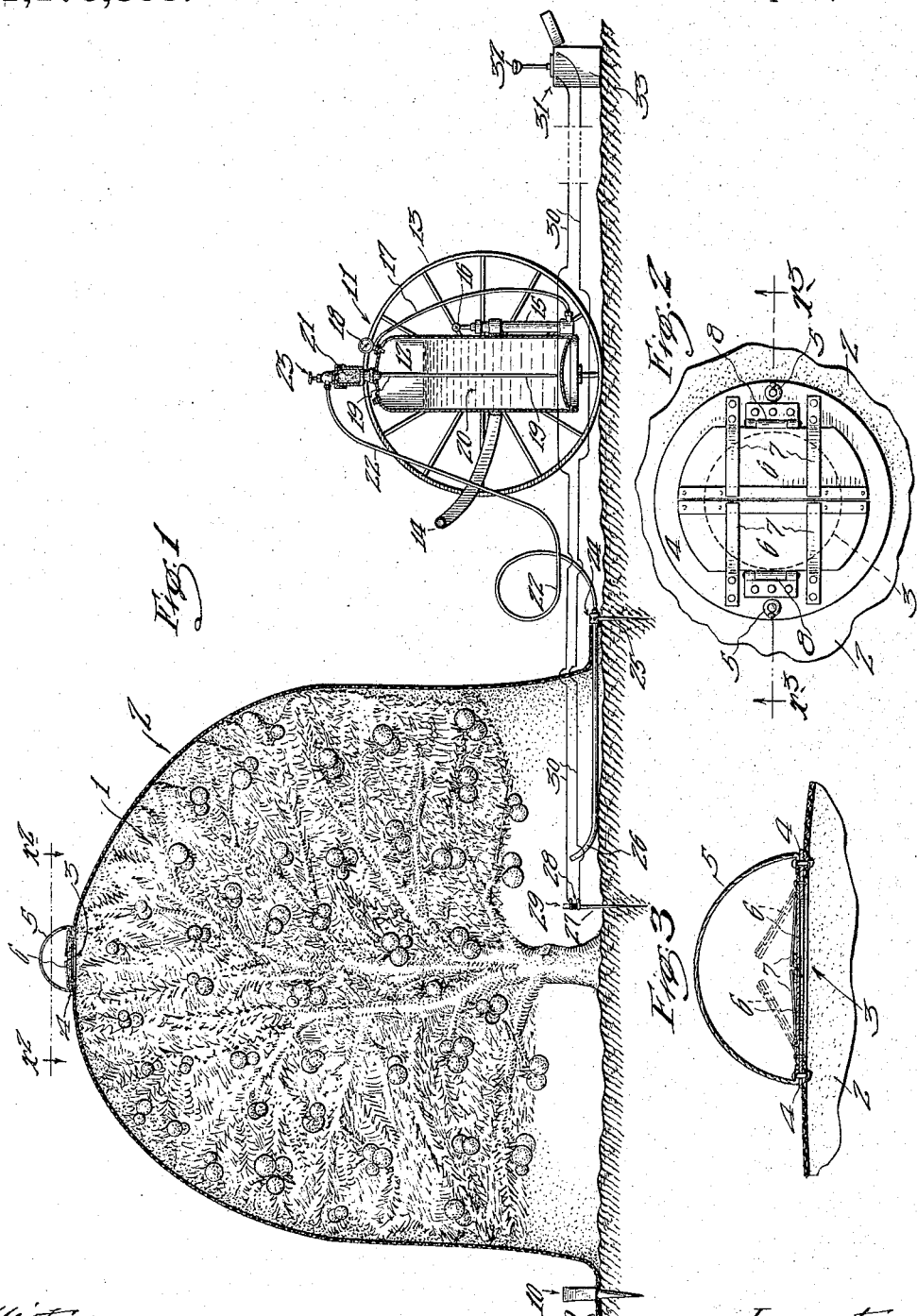

RANDOLPH C. HENDRICKS, OF RIVERSIDE, CALIFORNIA, ASSIGNOR OF ONE-HALF TO EDWARD McCLURE SYP, OF RIVERSIDE, CALIFORNIA.

PROCESS OF EXTERMINATING INSECT LIFE FROM TREES OR SHRUBS.

1,178,803.

Specification of Letters Patent.   Patented Apr. 11, 1916.

Application filed December 15, 1913.   Serial No. 806,921.

*To all whom it may concern:*

Be it known that I, RANDOLPH C. HENDRICKS, a citizen of the United States, residing at Riverside, in the county of Riverside and State of California, have invented a new and useful Process of Exterminating Insect Life from Trees or Shrubs, of which the following is a specification.

My invention relates to processes of exterminating insect life, and particularly to the extermination of scale, insects, and the like, from citrus or other trees. In the cultivation of any sort of fruit trees there are a number of insect pests against which the orchard owner must be constantly at war. It is common practice to spray the trees with various solutions for the purpose of destroying these pests, but such spraying is not entirely effective due to the difficulty of covering the entire surface of the tree with any sort of a liquid which may be projected into the tree. It is also common practice to cover the tree with a tent or cover and to fill the space under the cover with a poisonous gas for the same purpose. I have found that it is possible to put an explosive mixture under a similar cover, and by the ignition of such a mixture to entirely destroy any insect life under the cover.

The principal object of my invention is to provide means for accomplishing this result.

Other objects and advantages will appear hereinafter.

In the drawings, which are for illustrative purposes only: Figure 1 is an elevation, partly in section, of the apparatus used in carrying on my process. Fig. 2 is a sectional view on the line $x^2$—$x^2$ of Fig. 1, looking in the direction of the arrows. Fig. 3 is an enlarged view taken on the line $x^3$—$x^3$ of Fig. 2 of the valve and bail used in my invention.

In these drawings, 1 is a tree about which has been placed a cover 2. In the top of this cover is an opening 3 around which is secured a plate 4 to which is secured a bail 5 which may be of wire or flexible rope. Doors 6, normally held closed by springs 7, close the opening 3 being hinged to the plate 4 by means of the hinges 8.

The cover 2 consists preferably of canvas, or similar fabric, and is placed about the tree by any of the well known means in common use in handling fumigating covers. The lower portion of the cover is of sufficient length to lie on the ground as shown at 9, and may be staked down as shown at 10 if desired.

For the purpose of introducing an explosive mixture into the cover I employ a portable vaporizer 11. This vaporizer comprises a tank 12 carried on wheels 13 and moved from place to place by means of a handle 14. A hand pump 15, actuated through a handle 16 and provided with suitable valves, forces air through a pipe 17 into the top of the tank, a gage 18 being provided to observe the pressure of air inside this tank. A pipe 19 extends downwardly through the top of the tank 12 to a point very near the bottom thereof. A body of gasolene 20, or similar liquid, is placed in the tank 12 and the air pressure acting on the top of this liquid forces the gasolene upwardly through the pipe 19 and through a filter 21 into a pipe 22 which may, however, be closed by a valve 23. The pipe 22 extends to a carbureter 24 which may be fastened in the ground by means of a spike 25 and the gasolene is vaporized and mixed with air in this carbureter and passed into the interior of the cover through a pipe 26. In practice I actuate the hand pump sufficiently to give a considerable initial pressure on the liquid and manipulate the valve 23 to control the supply of gasolene passing to the carbureter 24, the tank 12 being of sufficient size to provide an explosive mixture for a considerable number of trees. When the cover 2 is filled with a sufficient amount of explosive mixture I ignite same by means of the arrangement shown in the drawings. A stake 27 is driven into the ground and carries a spark plug 28 which is provided with sparking points 29, this spark plug being any of the well known forms. Wires 30 extend through the cover to an igniting set 31 which is provided with a handle 32 which actuates a magneto carried in a box 33, but not shown. By pushing downward sharply on the handle 32 a considerable voltage is generated by the magneto in the box 33. This voltage causes a current to flow in the wires 30 and across the air gap between the points 29 causing a considerable spark at these points. This spark ignites the mixture inside the cover which is immediately thereafter entirely bathed in an intense flame of considerable pressure. I have found that the production of such an explosion and flame about the tree is fatal to all insect life in the tree, and that the process above described is a very efficient one of destroying such life. The valve at the top of the cover is provided for relieving this pressure.

I claim as my invention:

1. In a device for destroying insects on a tree, the combination of a cover adapted to surround a tree, means for causing an explosion inside said cover, and a valve for relieving the pressure of said explosion.

2. In a device for destroying insects on a tree, the combination of a cover for a tree, means for introducing an explosive mixture inside said cover, means for exploding said mixture, and means for relieving the pressure of said explosion from said cover.

3. In a device for destroying insects on a tree, the combination of a cover for a tree, means for injecting an explosive mixture inside said cover, manually operated electric means for exploding said mixture, and a valve for relieving the pressure of said explosion.

In testimony whereof, I have hereunto set my hand at Riverside, California, this 8th day of December, 1913.

RANDOLPH C. HENDRICKS.

In presence of—
C. F. HETZEL,
H. C. HIBBARD.

Copies of this patent may be obtained for five cents each, by addressing the "Commissioner of Patents, Washington, D. C."